United States Patent Office 3,260,140
Patented July 12, 1966

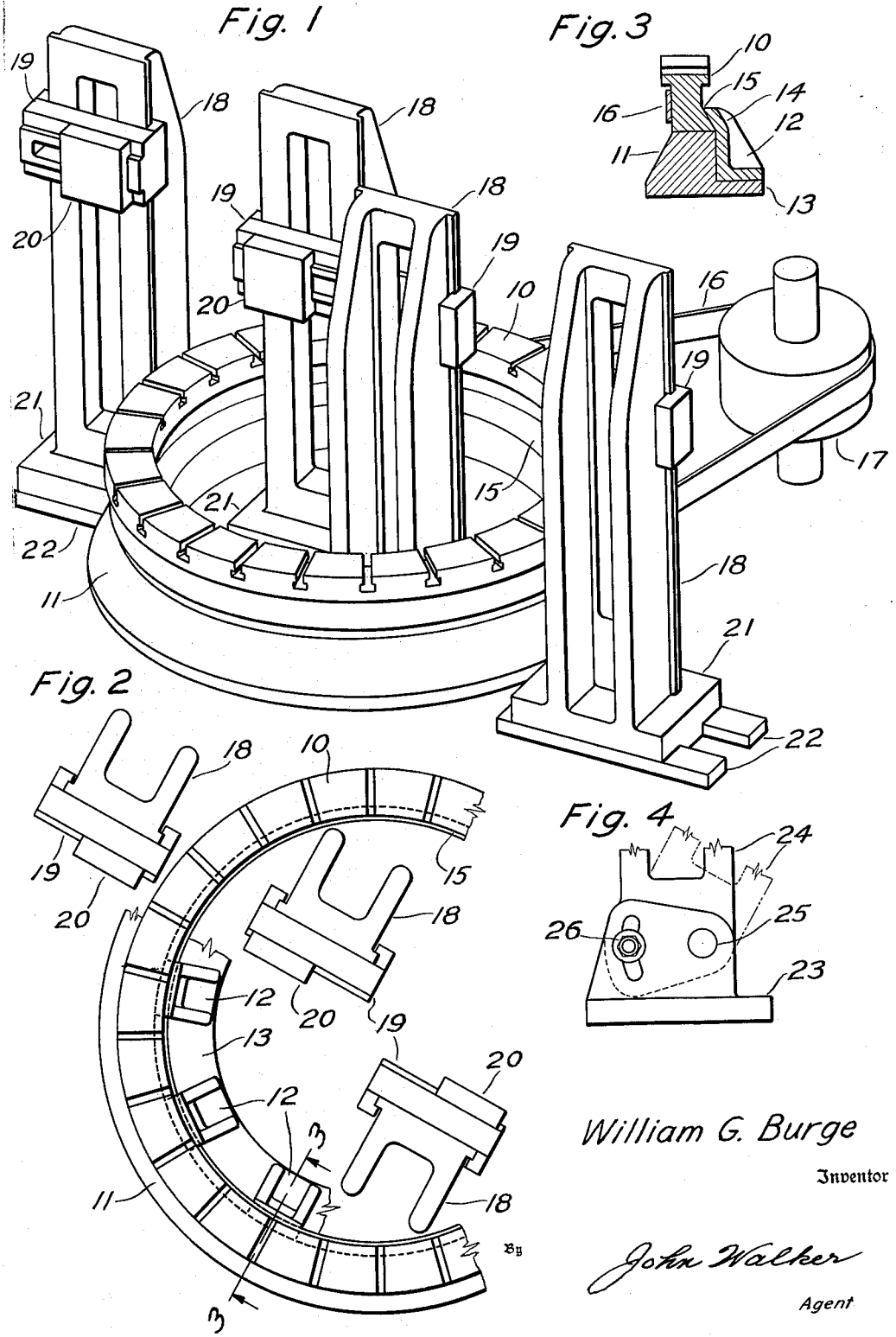

3,260,140
VERTICAL BORING MILLS
William G. Burge, 955 Seven Hills Ranch Road,
Walnut Creek, Calif.
Filed Nov. 26, 1963, Ser. No. 325,922
6 Claims. (Cl. 82—2)

This invention relates to machine tools, and more specifically to the type of machines known as vertical boring mills, sometimes referred to as vertical lathes.

The conventional design of machines of this type comprises a circular, horizontal bed or face plate rotatable about a vertical median line. Flanking the face plate, one being located on each side thereof, is a pair of columns in alignment with each other, and being connected by a crossmember or bridge. One or more tool carriages are usually mounted on the bridge. This design of machine has proved to be entirely satisfactory for the type of operation usually assigned to it, such as for instance, the facing and boring of large gears and pulleys, the facing and boring of propeller hubs, and the like. Generally, the machining of such elements, which, while being relatively large in diameter are comparatively narrow in width, presents no difficulty when performed on a machine of this class.

Castings, forgings and weldments that have to be finish bored, and which are relatively small in diameter and comparatively long, such as steam cylinders, pump bodies etc., are generally machined on a horizontal mill having a boring bar about which the piece to be machined is set in concentric relationship thereto.

With the advent of the space age, the need has become apparent for a machine capable of handling various missile and rocket components which are both relatively large in diameter as well as in length. These components, in addition to having the usual parallel bore, may also be formed with conical sections and frusto-conical sections, it is, therefore, apparent that the machines as described above are not adequate for the machining of parts of this description.

It is the principal object of the present invention to provide a vertical boring mill that is entirely suited to the machining of parts, of relatively large diameter and length, without any sacrifice of accuracy.

Another object of the invention is the provision of a machine that will not be of excessive height and will not require special overhead crane or building design.

Yet another object of the invention is the provision of a machine that will enable parts of tapered form to be readily handled.

A further object of the invention is the provision of a machine adapted to simultaneous operation on a plurality of surfaces of an element being machined.

A still further object of the invention is the provision of a machine having a rotatable face plate wherein the inherent inertia and operational kinetic energy is held to a minimum.

These and other objects of the invention will become apparent during the course of the following description and appended claims, taken in connection with the accompanying drawing, forming a part hereof.

In the drawing:

FIGURE 1 is an isometric projection of a preferred embodiment of the invention.

FIGURE 2 is a partial plan view of the machine illustrated in FIGURE 1.

FIGURE 3 is a section taken on line 3—3 of FIGURE 2.

FIGURE 4 is a fragmentary detail showing, in elementary form, a tool supporting column adapted to the machining of tapered sections.

Referring to the drawing in detail, it will be noted that the usual conventional bed or face plate, of solid disc construction, has been replaced by a face plate 10 of annular configuration. This face plate is rotatably mounted on a foundation plate 11, also of annular construction as can be seen in detail on the section of FIGURE 3. Axial alignment of the face plate 10 with the foundation plate 11 is maintained by a plurality of circumferentially spaced bearing chocks 12, which are secured in place on an inwardly projecting, horizontal flange 13 of the foundation plate 11. The vertically upstanding leg of the chock 12, at its upper end 14, is of divergent form, being complementary to a downwardly converging, frusto-conical inner section 15 at the lower edge of the face plate 10.

The restraining relationship of the contiguous faces 14 and 15 of the bearing chocks and the face plate respectively, and the resultant direction of reaction to any forces imposed between said surfaces, ensure the continued contact between the horizontal lower surface of the face plate and the horizontal upper face of the foundation plate in addition to the vertical alignment of these parts.

The bearing chocks 12 may be spaced as desired, as is indicated on FIGURE 2, their number and location being a matter of expediency and design.

While a particular method of mounting the face plate 10 has been illustrated and described, it should be understood that other methods may be adopted in the actual design and construction of a machine. Such showing is merely illustrative, and is intended to embrace all mechanical equivalents thereof.

The drive for the face plate 10 can be of any suitable type. In the present illustration, a belt 16 is indicated more or less diagrammatically, driven by a pulley 17 which, of course, will be connected to a source of power, not indicated on the drawing. One advantage of a drive as shown, in addition to its inherent characteristics of resiliency, is the fact that a judicious spacing of the bearing chocks can be effected, with a concentration of placement adapted to more effectively resist the resultant belt tension common to this type of drive.

With further reference to FIGURE 1, it will be noted that four columns 18 have been provided, two on the inside and two on the outside of the annular face plate 10. These columns 18 have their bases 21 adjustably mounted on tracks or ways 22, in order that they may be located and secured in the best position according to the dimensions of a piece to be machined. After the initial setting of the columns, longitudinal movement of the tools used for the machining operations, and the advancing or retracting of said tools will be performed by means of carriages 19 and cross-slides 20 respectively, in the usual manner. Obviously, a greater or lesser number and different arrangement of columns can be used as found most expedient for a given set of conditions.

The facilities provided by each of the columns can be operated simultaneously, either for parallel machining or tapered work, the latter being made possible by columns such as shown on FIGURE 4. On this disclosure, a separate base 23 is provided on which the main column 24 is pivotally mounted by means of a pin 25. Clamping of the column 24 at a predetermined angle is accomplished by means of a bolt 26. As stated hereinbefore, this illustration is elementary in nature, the final design of column incorporating angle adjusting means and a more positive locking method.

Further provision for taper turning will also be incorporated in the design of the cross-slides in the manner well known in the art. Automatic feeds for the carriages and cross-slides will also be provided.

From the foregoing it will be apparent that I have provided a machine ideally adapted to the finishing of relatively large tubular objects which are of a length such that the machining of them, on mills of conventional design is rendered impractical. I have also provided a machine which can be serviced by overhead crane facilities operating at normal elevations above a shop floor.

While I have disclosed a preferred embodiment of my invention, I do not wish to be limited specifically thereto, as it should be understood that modifications may be made within the spirit and scope of the appended claims.

I claim:

1. A vertical boring mill comprising an annular face plate, foundation means for rotatably mounting said face plate, a column mounted outside of said face plate in predetermined positional relationship thereto and being provided with tool guiding and supporting carriage and cross-slide means, and a second column mounted inside of said face plate in predetermined positional relationship thereto and being provided with tool guiding and supporting carriage and cross-slide means, said first mentioned column and its said tool guiding and supporting carriage and cross-slide means being mounted independently of said second mentioned column and its said tool guiding and supporting carriage and cross-slide means and vice versa.

2. A vertical boring mill as in claim 1 wherein said face plate has a plurality of columns mounted on the inside thereof.

3. A vertical boring mill as in claim 1 wherein said face plate has a plurality of columns mounted on the outside thereof.

4. A vertical boring mill as in claim 1 wherein said columns are angularly adjustable relative to the vertical median line of said mill.

5. A vertical boring mill as in claim 1 wherein said columns are adjustable relative to their radial distance from the center of said face plate.

6. A vertical boring mill comprising an annular face plate, foundation means for rotatably mounting said face plate, a column mounted inside of said face plate in predetermined positional relationship thereto, and being provided with tool guiding and supporting carriage and cross-slide means, said column being the sole support for said carriage and cross-slide means.

References Cited by the Examiner

UNITED STATES PATENTS

| | | |
|---|---|---|
| 2,415,269 | 2/1947 | Yoemans et al. 77—4 X |
| 2,750,851 | 6/1956 | Berthiez 77—3 X |
| 3,057,234 | 10/1962 | Heer. |

FOREIGN PATENTS

| | | |
|---|---|---|
| 973,708 | 9/1950 | France. |

WILLIAM W. DYER, JR., *Primary Examiner.*

L. VLACHOS, *Assistant Examiner.*